United States Patent
Van Den Beukel

(10) Patent No.: US 10,912,277 B2
(45) Date of Patent: Feb. 9, 2021

(54) MANURE-REMOVAL VEHICLE FOR REMOVING MANURE FROM AN ANIMAL-SHED FLOOR

(71) Applicant: LELY PATENT N.V., Maassluis (NL)

(72) Inventor: Huibrecht Johannes Arjen Van Den Beukel, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 381 days.

(21) Appl. No.: 15/770,097

(22) PCT Filed: Sep. 19, 2016

(86) PCT No.: PCT/NL2016/050644
§ 371 (c)(1),
(2) Date: Apr. 20, 2018

(87) PCT Pub. No.: WO2017/069615
PCT Pub. Date: Apr. 27, 2017

(65) Prior Publication Data
US 2018/0310519 A1 Nov. 1, 2018

(30) Foreign Application Priority Data
Oct. 23, 2015 (NL) ...................... 2015650

(51) Int. Cl.
*A01K 1/01* (2006.01)
*B60P 3/22* (2006.01)

(52) U.S. Cl.
CPC .............. *A01K 1/0128* (2013.01); *A01K 1/01* (2013.01); *A01K 1/0132* (2013.01);
(Continued)

(58) Field of Classification Search
CPC ...... A01K 1/0128; A01K 1/01; A01K 1/0132; B60P 3/2205; B60P 3/2245; B60P 3/225
See application file for complete search history.

(56) References Cited

U.S. PATENT DOCUMENTS

2007/0199954 A1 8/2007 Law et al.
2012/0090110 A1 4/2012 Van Den Berg et al.
(Continued)

FOREIGN PATENT DOCUMENTS

| EP | 2 484 205 A1 | 8/2012 |
| NL | 1036552 C | 8/2010 |
| WO | WO 2013/010785 A1 | 1/2013 |

OTHER PUBLICATIONS

International Search Report for PCT/NL2016/050644 (PCT/ISA/210) dated Dec. 13, 2016.
(Continued)

*Primary Examiner* — David Redding
(74) *Attorney, Agent, or Firm* — Birch, Stewart, Kolasch & Birch, LLP

(57) ABSTRACT

A wheeled manure-removal vehicle for removing manure from an animal-shed floor includes a tank for storing manure, a manure collector, a liquid reservoir placed in the tank and having an opening for the supply of liquid to the reservoir and the discharge of liquid from the reservoir, and a flexible reservoir wall, to make it possible to vary the volume of the reservoir, depending on the fill level, and a dispenser operatively connected to the reservoir for dispensing liquid from the reservoir onto the animal-shed floor. The opening of the reservoir is situated in a top part of the reservoir. The reservoir furthermore includes a spacer which extends on the inside of the reservoir from the opening down to the lower part of the reservoir to ensure a liquid passage between the opening and a bottom part of the reservoir.

19 Claims, 3 Drawing Sheets

Figure 1:
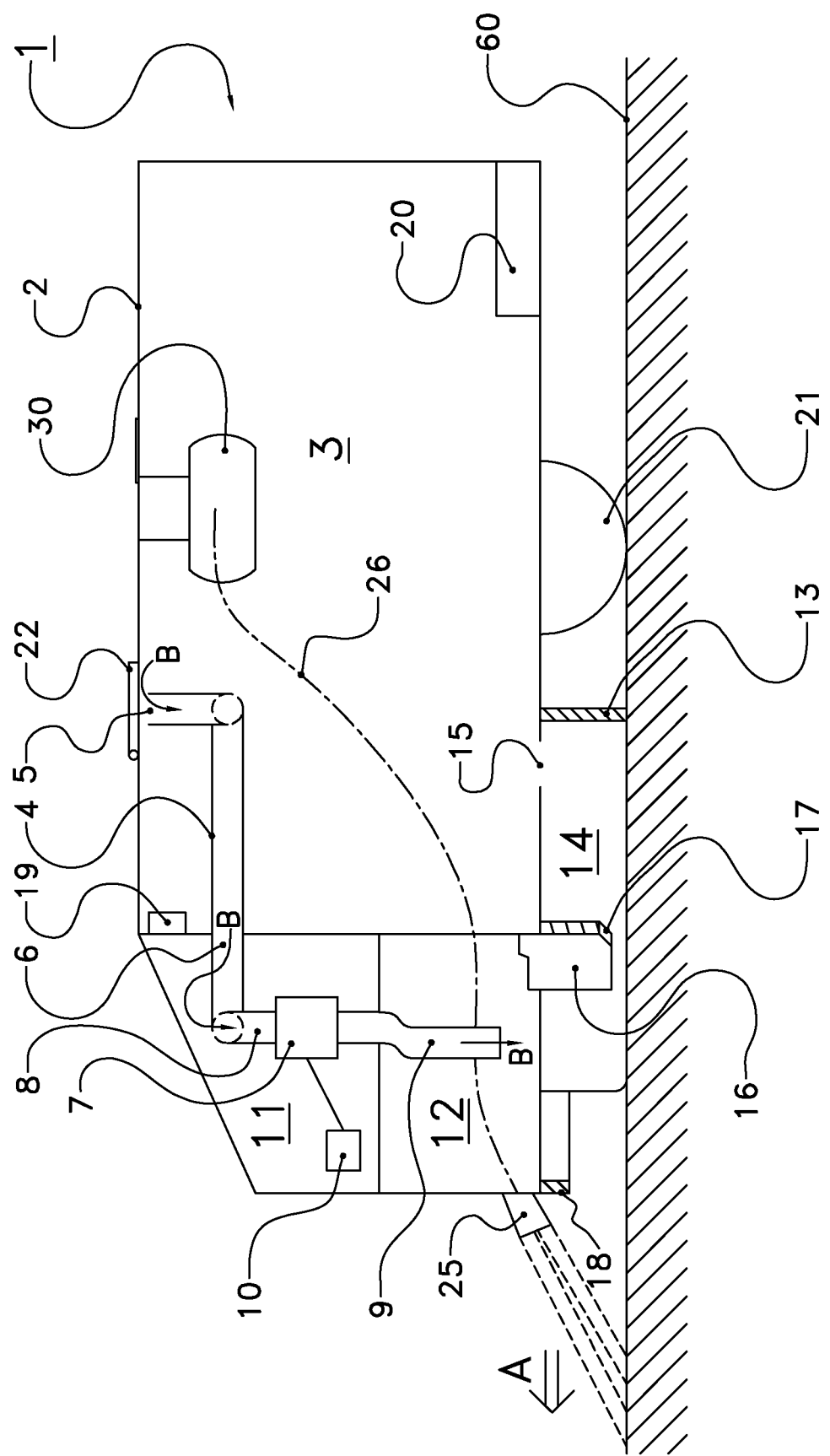

(52) U.S. Cl.
CPC ............ *B60P 3/2205* (2013.01); *B60P 3/225* (2013.01); *B60P 3/2245* (2013.01)

(56) References Cited

U.S. PATENT DOCUMENTS

2014/0124000 A1\* 5/2014 Hillforth ............... A01K 1/0128
134/6
2014/0361039 A1 12/2014 Ortiz-Hernandez et al.

OTHER PUBLICATIONS

Written Opinion of the International Searching Authority for PCT/NL2016/050644 (PCT/ISA/237) dated Dec. 13, 2016.

\* cited by examiner

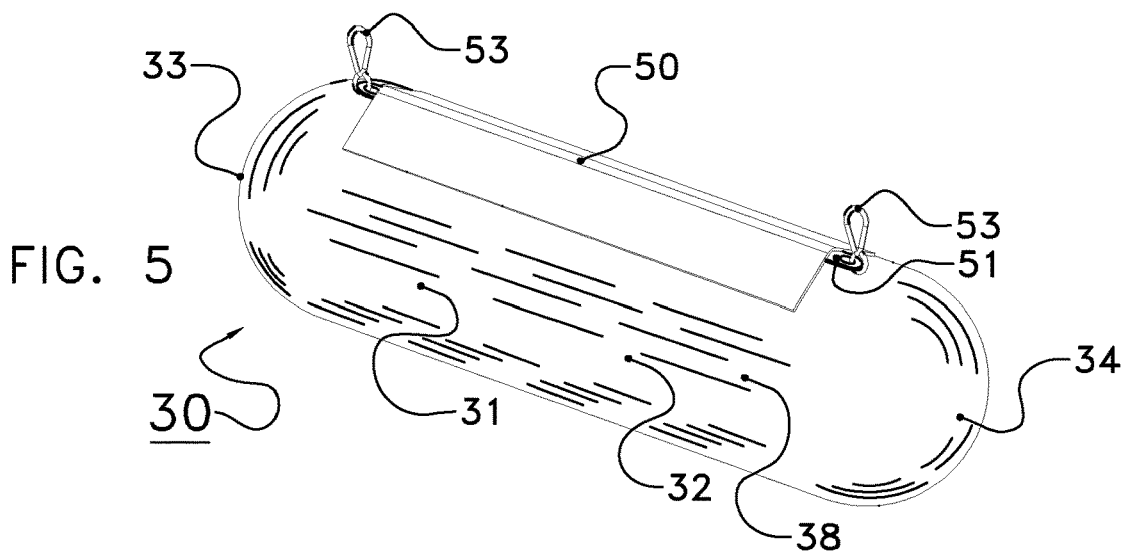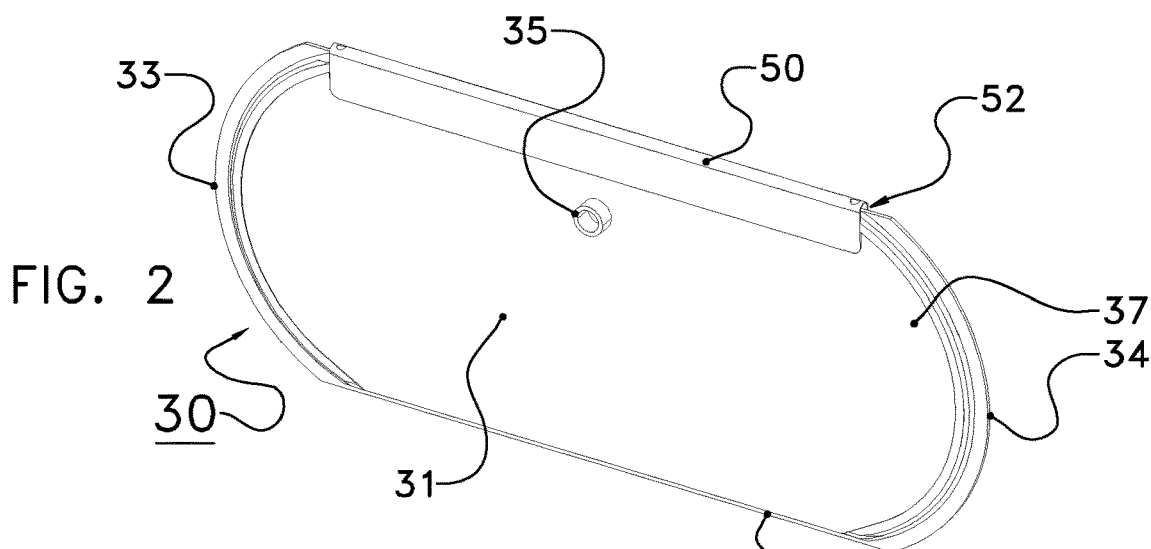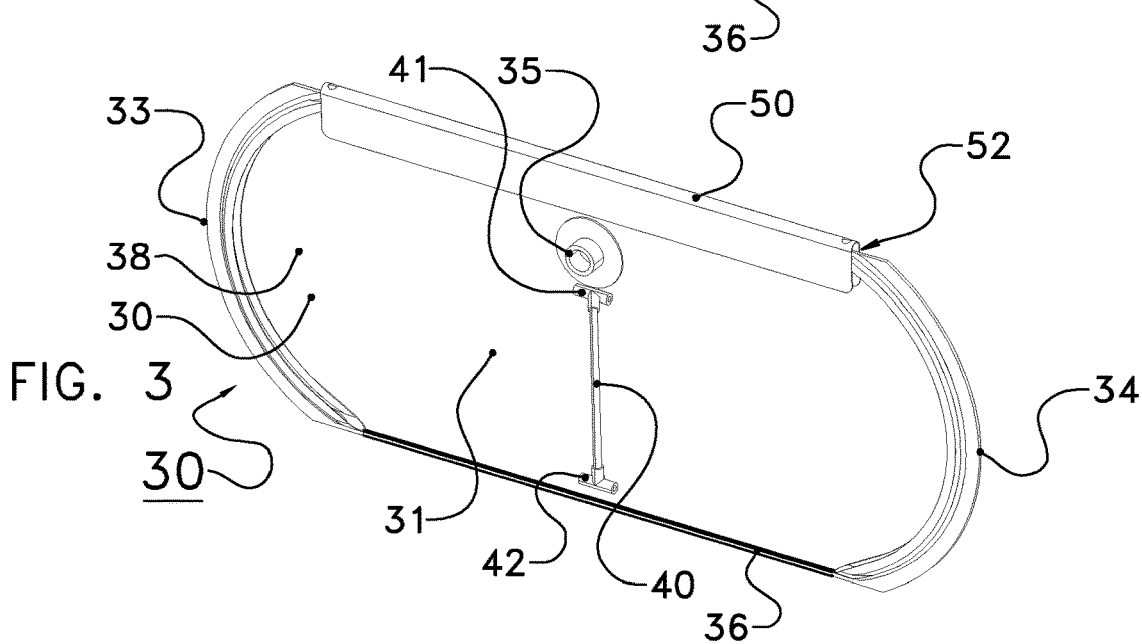

MANURE-REMOVAL VEHICLE FOR REMOVING MANURE FROM AN ANIMAL-SHED FLOOR

The invention relates to a wheeled manure-removal vehicle for removing manure from an animal-shed floor, comprising a tank for storing manure and manure-collecting means. The invention also relates to a liquid reservoir of such a vehicle.

The term manure, as used in the present text, should be understood to be an all-encompassing term for manure and any other dirt which may be present on an animal-shed floor with the manure, such as feed remains. Terms such as upper and top and lower and bottom, as used in the present text, should be understood to refer to a normal, operational orientation of the vehicle, in which the vehicle can drive across an animal-shed floor to be cleaned and can perform the intended manure-removal function.

A manure-removal vehicle comprising a tank for storing manure and manure-collecting means is known, for example from WO-2013/010785-A1. The known vehicle is self-propelled and comprises at least two wheels, one motor and a control device for displacing the vehicle in a desired direction of travel by driving at least one of the wheels. The known vehicle furthermore comprises a tank for storing manure, with an air discharge in its top side, and furthermore with a manure supply opening and a manure discharge opening. A vacuum pump which is connected to the control device is provided in order to apply a partial vacuum to the tank via the air discharge. The known vehicle has a manure-collecting device, with a floor-scraping part which, viewed counter to the intended direction of travel, narrows towards a closed end, in which the manure supply opening, viewed in the intended direction of travel, is situated in front of the floor-scraping part and is at least partly surrounded by the floor-scraping part.

For the purpose of collecting manure from an animal-shed floor, the vehicle is activated to drive across the animal-shed floor. During the driving, the floor-scraping part, which is also referred to as manure slide, collects manure and concentrates it at a location near the manure supply opening of the tank, where the manure can be sucked up on the basis of the action of the vacuum pump. The floor-scraping part may be made from any suitable material or from any suitable combination of materials, such as steel and rubber. A detail regarding the action of the known vehicle is that a substantially constant amount of manure will accumulate in front the floor-scraping part, obviously slightly dependent on the supply thereof. The vacuum in the tank created by the pump ensures that the manure is sucked up, but as soon as there is insufficient supply or suction power, nothing more will happen really. At most, the manure will no longer be sucked up, but it will also not seep from the tank completely due to its own consistency. The manure remains suspended in the tank, as it were, due to the vacuum which prevails in the tank, which vacuum would only increase if the manure were to seep from the tank. In addition, manure is in fact prevented from running out of the tank by the manure which is still in front of the floor-scraping part. The result of all this is that a kind of manure supply is almost permanently situated in front of the floor-scraping part and is pushed across the animal-shed floor when the vehicle moves.

The manure supply opening of the tank of the known vehicle is near the narrowed end of the floor-scraping part. The vehicle is in particular suitable for collecting manure from sealed animal-shed floors. With slatted floors and other floors comprising openings, collecting manure by pushing it together is in fact hardly possible.

With the known vehicle, the manure supply opening and the manure discharge opening coincide in a single opening and this opening is partly, preferably completely, at a bottom level of the tank bottom. At the single opening of the tank of the vehicle, a pipe may be provided by means of which any difference in height between the tank bottom and a location where manure is being sucked up can be bridged. Due to the positioning of the single opening in the tank, it is not necessary to provide the pump with a reversing device for discharging manure from the tank in a suitable location, such as over an opening in the animal-shed floor of a manure-storage space situated under the animal-shed floor. The manure will be able to flow out of the tank on account of the force of gravity, certainly when the pump is switched off. A reverse action of the pump is thus not required in this case to achieve a discharge of the manure.

In order to improve collection of manure by the vehicle, it is advantageous if the animal-shed floor is moistened. This has the effect that there will be no, or at least much less, film formation on the floor, as a result of which there is hardly any risk of new manure sticking. It should be noted in this context, that NL-1036552-C discloses a manure-removal vehicle which is provided with spray nozzles, which are configured and positioned to release liquid onto the animal-shed floor while the vehicle is in action, in particular in an area of the floor which, viewed in the intended direction of travel of the vehicle, is situated in front of the floor-scraping part. The use of such spray nozzles furthermore results in an application of in any case features for a liquid supply in the vehicle and a spray nozzle control.

It is an object of the invention to provide a new type of wheeled manure-removal vehicle, in particular a manure-removal vehicle which is provided with a tank for storing manure, manure-collecting means, a liquid reservoir which has an opening for supplying liquid to the reservoir and discharging liquid from the reservoir, and dispensing means which are operatively connected to the reservoir for dispensing liquid from the reservoir onto the animal-shed floor.

The object of the invention is achieved by a wheeled vehicle as claimed in claim 1, in particular a wheeled vehicle for removing manure from an animal-shed floor, comprising a tank for storing manure, manure-collecting means, a liquid reservoir placed in the tank and having an opening for the supply of liquid to the reservoir and the discharge of liquid from the reservoir, and a flexible reservoir wall, and dispensing means which are operatively connected to the reservoir for dispensing liquid from the reservoir onto the animal-shed floor, wherein the opening of the reservoir is situated in a top part of the reservoir, and wherein the reservoir comprises spacer means which extend on the inside of the reservoir from the opening down to the lower part of the reservoir to ensure a liquid passage between the opening and a bottom part of the reservoir.

A first advantageous aspect of the manure-removal vehicle according to the invention is related to the use of a reservoir with a flexible reservoir wall. This makes it possible for the reservoir to be positioned in the tank for storing manure without significantly reducing the storage volume of the tank. The reason for this is that the flexible reservoir wall makes it possible to vary the volume of the reservoir, depending on the fill level. In particular, on the basis of the flexibility of the reservoir wall, the reservoir will occupy more space at the start of an operation of the vehicle on an animal-shed floor to be cleaned than during this operation. When the reservoir is empty, it only occupies a minimal part of the storage volume of the tank. This complements the collection of manure in the tank well. After all, during an operation of the vehicle across an animal-shed floor to be cleaned, the degree to which the tank is filled will gradually increase. Finally, the tank may be completely full while the reservoir only has minimal dimensions or, in any case, dimensions which are significantly smaller than at the start of the operation, and thus leave room for manure which would not be available had a reservoir of fixed shape been used. On the basis of this advantageous aspect of the manure-removal vehicle according to the invention, it is completely unnecessary to increase the storage volume of the tank, or only a minimal increase of said storage volume is required which is smaller than the desired maximum volume of the reservoir, if it is envisaged, during the design phase of the vehicle, to use a reservoir for storing liquid to be dispensed onto the animal-shed floor.

A second advantageous aspect of the manure-removal vehicle according to the invention is related to the positioning of the opening of the reservoir in the top part of the reservoir. This makes it possible to suspend the reservoir in the tank by its upper side only and still only have minimal movement of a liquid line which is connected to the reservoir. In addition, this makes it possible for the connection of the liquid line to the reservoir to be kept as far away as possible from the area where the flow of manure is strongest, that is to say, the area of the tank in which the opening of the tank is situated.

A third advantageous aspect of the manure-removal vehicle according to the invention is related to the use of spacer means in the reservoir which extend on the inside of the reservoir from the opening up to the lower part of the reservoir to ensure a liquid passage between the opening and a bottom part of the reservoir. Such spacer means prevent a situation in which the reservoir, as it empties, closes up on the inside, as it were, due to the wall portions collapsing inwards and touching each other, wherein a tendency of these wall portions to remain abutted against each is reinforced by the presence of a small layer of liquid between the wall portions. By ensuring the liquid passage between the opening of the reservoir and a bottom part of the reservoir, the reservoir can finally be emptied completely and be made as small as possible. In addition, refilling of the reservoir can take place without any impediments or problems.

Similar to the manure-removal vehicles known from WO-2013/010785-A1 and NL-1036552-C, the manure-removal vehicle according to the invention is particularly suitable for use with animal-shed floors which are closed.

In a practical embodiment, said spacer means of the reservoir comprise an elongate body which extends on the inside of the reservoir, between an attachment location which is situated at the highest at the location of the opening of the reservoir and an attachment location which is situated at the lowest at a bottom of the reservoir. The elongate body is preferably flexible so as not to hinder a change in shape of the reservoir resulting from a change in volume thereof, and may comprise, for example, a bar or a tube. In the latter case, the tube, which is hollow, may be perforated in order to prevent, as far as possible, the application of the functionality of keeping the reservoir open from being accompanied by liquid in the reservoir being prevented from moving, due to the fact that a flow of liquid in the reservoir through the tube to the outside is ensured.

As has already been mentioned, it is a practical option to ensure that the design of the vehicle according to the invention is such that the reservoir is suspended in the tank only by its top side. This makes it possible to ensure that the reservoir cannot touch the inner wall of the tank, thus preventing wear of the material of the reservoir. This makes it possible to use common flexible material, such as canvas, which is relatively delicate and susceptible to wear, in the reservoir wall. The proposed way of suspending the reservoir has the further advantage that tensions are evenly distributed in the material of the reservoir.

If the reservoir is only suspended in the tank by its upper side, it is practical if the reservoir is suspended on a top wall part of the tank. It is then also practical, when the reservoir is situated in a top part of the tank, because this ensures that the stream of manure at a lower level in the tank is not impeded as long as the moment when the tank is almost completely full has not been reached yet.

For the purpose of suspending the reservoir in the tank, the reservoir may have a hollow tubular space on its top side, wherein a suspension means is provided which extends through the space, and wherein ends of the suspension means which extend outside the space are attached to a wall part of the tank. In this connection, it should be noted that the attachment of the ends of the suspension means to the wall part of the tank is preferably effected in a detachable way, which may, for example, be the case when carabiners are used. The reservoir can then, where appropriate, readily be removed from the tank when the need arises and, for example, be checked, repaired or replaced.

In a practical embodiment, the hollow tubular space is produced at the top side of the reservoir, because the top side of the reservoir is provided with an elongate strip having a U-shaped cross section, and furthermore comprises a bag of flexible material, wherein the elongate strip is arranged on an edge portion of the bag, with the edge portion being incorporated therein, and wherein the elongate strip is deformable, at least to allow variation with regard to the degree to which the U-shaped cross section is opened up. The hollow tubular space is then formed by the bottom portion of the U shape of the elongate strip. The fact that the strip is deformable, in particular in such a manner that the degree to which the U shape is opened up can be varied, makes it possible to prevent the presence of the strip on the bag from hindering a change in shape of the bag due to an influx or a discharge of liquid.

It is advantageous if the bag of the reservoir is designed in such a way that it is cylindrical in the filled state, has an oval or round cross section and convex ends. A bag of such design may be assembled in a flat state from a number of base parts, which makes it easier to produce weld seams between the base parts. Furthermore, such a design makes it possible to distribute tension on the bag material across the bag in an optimum manner and to minimize creasing/rippling of the bag so as to reduce the risk of damage to the bag due to material fatigue.

It is practical if the dispensing means for dispensing liquid from the reservoir onto an animal-shed floor to be cleaned comprise at least one spray nozzle, and if a duct is also provided which extends between the opening of the reservoir and the spray nozzle. It is furthermore practical if the positioning and orientation of the at least one spray nozzle are selected to make the spray nozzle, during operation, spray liquid in a direction which is at an angle to the front and to the bottom with respect to the vehicle. In this connection, it should be noted that the designation of a direction as being to the front refers to an intended direction of travel of the vehicle.

The vehicle is preferably self-propelled, meaning it can be a manned or an autonomous self-propelled vehicle. A self-propelled vehicle preferably comprises a battery and a connector for connection to an external battery-charging means for the purpose of charging the battery.

Figure 4:
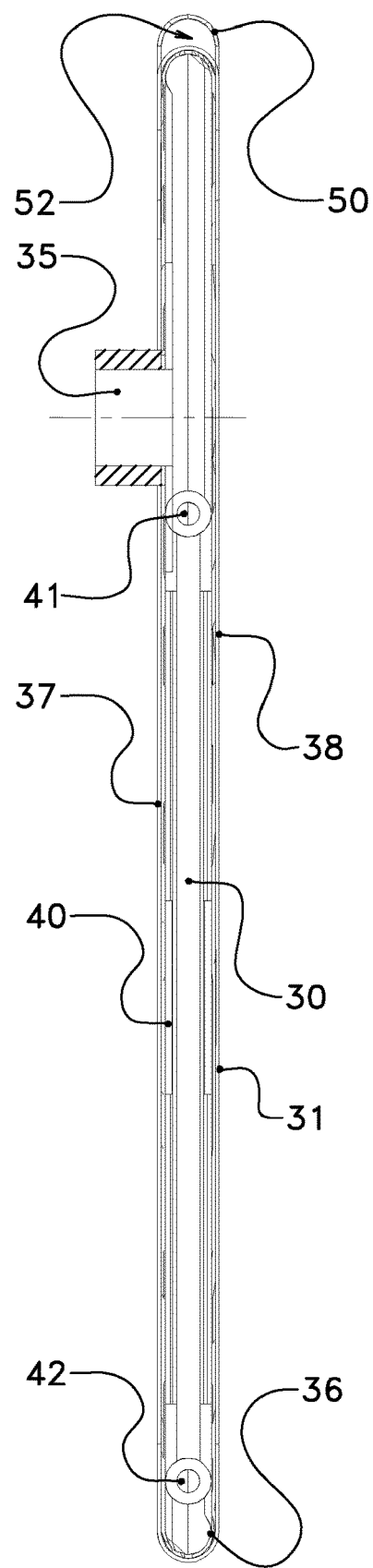

The abovementioned and other aspects of the invention will be explained below with reference to the drawing, which shows a non-limiting exemplary embodiment of the invention, in which:

FIG. 1 diagrammatically shows a sectional view of a manure-removal vehicle according to the invention, FIGS. 2 and 3 diagrammatically show a perspective view of a liquid reservoir of the vehicle shown in FIG. 1, in a non-filled state, where one side of the reservoir which contains a filling opening is directed to the front in FIG. 2, and the other side of the reservoir is directed to the front and a spacer tube which is present on the inside of the reservoir is illustrated in FIG. 3, FIG. 4 diagrammatically shows a sectional view of the liquid reservoir illustrated in FIGS. 2 and 3, in a non-filled state, and FIG. 5 diagrammatically shows a perspective view of the liquid reservoir illustrated in FIGS. 2 and 3, in a completely filled state, with a means for suspending the reservoir at its top side.

FIG. 1 shows a manure-removal vehicle 1 according to the invention. The vehicle 1 comprises a tank 2 with a manure-storage space 3. At the top, the manure-storage space 3 has an air discharge 4 with an air intake aperture 5 and an air-discharge aperture 6. The vehicle 1 furthermore comprises a pump 7 with an intake pipe 8 and an expelling pipe 9. The pump 7 and a control device 10 for the pump 7 are situated in a control space 11 which is provided next to the manure-storage space 3. Below the control space 11, there is an expelling space 12.

A floor scraper 13 delimits the rear side of a manure intake storage space 14 which is in communication with a manure inlet opening 15 to the tank 2. At the front side, the space is delimited by a sealing panel 16 with a recess 17. At the very front, there is an optional front pusher 18. FIG. 1 furthermore shows a level sensor 19, a battery 20, one of two wheels 21, and a cover 22 of the vehicle 1.

In the illustrated example, the volume of the tank 2, or the manure-storage space 3, viewed in a direction of travel of the vehicle 1 which is indicated in FIG. 1 by an arrow A, is symmetrical with respect to the wheels 21. One of the effects this has is that no tilting of the tank 2 occurs during filling of the manure-storage space 3 which would have an effect on the floor pressure on the floor scraper 13.

In the illustrated example, the air intake aperture 5 of the air discharge 4 is situated at the top of the manure-storage space 3. Due to this, the manure-storage space 3 can be filled to a maximum degree. To prevent that too much manure is sucked in and ends up in the pump via the air extractor system, indicated by the arrows B, in the abovementioned level sensor 19 is provided which can switch off the pump 7, if desired, when an excessive level is reached. Should any manure, dirt, etc. end up in the air discharge 4 and in the pump 7, these can be cleaned in a simple manner by opening the cover 22 and flushing them, for example with water and/or another suitable cleaning agent. FIG. 1 shows how the cover 22 may be in a position on top of the tank 2, which does not preclude that it may also be incorporated in the top side of the tank 2. An example of the total height of the vehicle 1 is a height of 60 cm, due to which it can pass under standard fences in dairy farming. Obviously, other heights of the vehicle 1 are also possible within the scope of the invention.

The intake pipe 8 of the pump 7 is in principle connected to the air discharge 4. The pump 7 and the control unit 10 for controlling the pump 7 and possibly also other components, such as the motor and wheels 21 of the vehicle 1, are situated in the control space 11 which is practically inaccessible by material from the manure-storage space 3. The pump 7 is preferably a so-called dirty water pump, as are known for use on ships and the like. This type of pump is particularly well able to withstand (extremely) dirty water and the like, and therefore also manure, which is advantageous in case manure unintentionally ends up in the pump 7. In practice, the pump 7 may require very low power. Thus, the partial vacuum which is to be generated in the manure-storage space 3 does not have to be in excess of 0.06 bar at a tank height of 60 cm. In addition, the air discharge speed does not have to be great either; in principle, it is sufficient if the air discharge speed is as high as the manure supply speed. The latter speed obviously depends on the driving speed of the vehicle 1 and the thickness of the manure layer to be collected. In practice, a flow rate of a few tens of liters per minute is already sufficient to keep a dairy animal shed sufficiently clean. Due to the required power being low, it is highly feasible in practice for the vehicle 1 according to the invention to be designed as an autonomous vehicle with its own power supply.

Viewed in the direction of travel A of the vehicle 1, the manure inlet opening 15 is situated at the end of the manure intake storage space 14 which, on one side, is delimited by the floor scraper 13 and, on the other side, by the sealing panel 16. On its underside, the sealing panel 16 is provided with a recess 17, and the sealing panel 16 protrudes slightly less downwards from the vehicle 1 than the floor scraper 13, resulting in a level difference of the undersides of the sealing panel 16 and the floor scraper 13 in the order of magnitude of a few centimeters at most. Thus, manure to be collected and sucked up can pass under the sealing panel 16 and reach the manure intake storage space 14, so that a supply of manure is in principle continuously present in said location when the vehicle 1 is moving. It is advantageous to cover the manure inlet opening 15 continuously with manure, so that no air but only manure is sucked up to the tank 2. If desired, an additional amount of manure may be sucked up from a position for the sealing panel 16, in case a manure buffer has formed there.

At the front of the vehicle 1, there is a front pusher 18 which is able to prevent foreign bodies, such as stones and the like, from ending up underneath the vehicle 1. The sealing panel 16 is preferably flexible, so that bodies which are relatively large, but can still pass under the front pusher 18, such as grass clumps and the like, can still be reliably discharged by bending the sealing panel 16, namely via the manure inlet opening 15. The degree to which the front pusher 18 extends from the vehicle 1 downwards is selected such that relatively large chunks which are unable to pass under the sealing panel 16 which is bent to a maximum degree, are efficiently blocked by the front pusher 18.

The drive mechanism of the wheels 21 of the vehicle 1 is powered electrically by the battery 20 and controlled by the control unit 10. The floor scraper 13 may serve as a third support for the vehicle 1 on a substrate, in particular an animal-shed floor 60 to be cleaned. However, it is also possible for a swivel wheel (not shown) to be provided as a third support for the vehicle 1. This option is advantageous with regard to steering the vehicle 1.

The vehicle 1 is provided with at least one spray nozzle 25 for the supply of liquid to an area of the animal-shed floor 60 which, viewed in the direction of travel A of the vehicle 1, is situated in front of the vehicle 1. In order to illustrate the action of the spray nozzle 25, jets of liquid as they are produced by the spray nozzle 25 during operation are indicated diagrammatically by means of dashed lines in FIG. 1. The spray nozzle 25 is positioned and configured to dispense the liquid at an angle to the front and to the bottom. In general, it is advantageous for the cleaning function of the vehicle 1 if an area to which the vehicle 1 is headed, is always sprayed with liquid. In this case, it is important that at least an area which is situated in front of the floor scraper 13 is moistened just before the floor scraper 13 passes over it. It is therefore also possible, in principle, to fit at least one spray nozzle 25 underneath the vehicle 1, for example in a position which, in the direction of travel A of the vehicle, is a position between the front scraper 18 and the sealing panel 16.

The tank 2 contains a reservoir 30 for spraying liquid, that is to say liquid which is supplied to the at least one spray nozzle 25 during operation of the vehicle 1, via a duct system 26 which is provided for this purpose and which is indicated diagrammatically by means of a dash-dotted line in FIG. 1. In the illustrated example, the reservoir 30 is situated in a top part of the tank 2. Details of the reservoir 30, which is only shown diagrammatically in FIG. 1, will be explained in more detail below with reference to FIGS. 2-5. Incidentally, a pump for spraying the liquid via the spray nozzle 25 is not shown here either. The details thereof will be clear to those skilled in the art and do not form part of the scope of the present invention.

The reservoir 30 comprises a bag 31 of flexible material which is capable of holding an amount of spraying liquid in a liquid-tight manner. The bag 31 acts as a flexible wall for the reservoir 30, as a result of which it is possible for the reservoir 30 to have an appearance which depends on the fill level. If the reservoir 30 is completely empty, it has a flat appearance, as can be seen, in particular, in FIGS. 2-4, in which the reservoir 30 has a minimal volume. If the reservoir 30 is completely filled, it has a substantially cylindrical appearance, as can be seen, in particular, in FIG. 5, in which the reservoir 30 has a maximal volume. In particular, in the illustrated example, the bag 31 has the shape of a cylinder 32 in the completely filled state, with a round cross section and convex ends 33, 34.

FIGS. 2-5 show the reservoir 30 in a normal orientation. In this orientation, an opening 35 of the reservoir 30 is situated at a top side of the reservoir 30. When the reservoir 30 is accommodated in the vehicle 1, then the duct system 26 is connected to the opening 35, on the one hand to enable the supply of spraying liquid from the reservoir 30 to the at least one spray nozzle 25 and, on the other hand to enable the supply of spraying liquid to the reservoir 30 when it has to be filled (up). The same duct may be used for this filling (up) as that used for pumping to the spray nozzle, for example by pressurized filling. A connection (not shown) may for example be provided at the front side of the vehicle for the purpose of filling in general, such as via a separate filling coupling. It should be noted here that this filling coupling is preferably closeable under prestress, and then opens at a predetermined minimum fill power. This fill power is related to the possibility that there may be a partial vacuum in the space 3 which is then obviously also present in the reservoir 30 and the duct 26, and thus also at the filling coupling. Without prestress, air might be drawn in, which is undesirable. The filling coupling is therefore preferably provided with, for example, a spring or the like in order to close off the filling coupling under prestress. The fill power to be generated is supplied, for example, by a countercoupling, via which filling is effected.

Incidentally, it is also possible that, for example after filling, there is an overpressure on the reservoir 30. In order to prevent liquid from then unintentionally leaking away via the spray nozzle 25, the duct 26 is advantageously provided with a valve near the spray nozzle 25 (between the pump (not shown) and the spray nozzle), which valve only opens at a predetermined overpressure, such as a non-return valve. This valve is not shown here either, although details will be clear to those skilled in the art.

FIGS. 3 and 4 illustrate that the reservoir 30 is provided with a spacer tube 40 which extends on the inside of the reservoir 30, between a highest attachment location 41, just below the opening 35 of the reservoir 30, and a lowest attachment location 42, just above the bottom 36 of the reservoir 30. Here, it should be noted that these attachment locations, also referred to as fixing locations, relate to the attachment or fixing of the spacer tube 40 with respect to the reservoir 30. To this end, a loop is provided in each case, for example at location 41 and location 42, and the spacer tube 40 is provided at each end with a T-shaped outflow piece with a double outflow. As a result thereof, the spacer tube 40 is locked in, at least at its ends, between the locations 41 and 42, but the tube in between can move concomitantly with the reservoir and the changes in shape thereof. Furthermore, a T-shaped outflow piece has still further advantages, in particular at the lowest attachment location 42. As the reservoir 30 empties, the spacer tube 40 might prick the bottom of the reservoir, which causes undesired wear or perforation risks. Due to the fact that the bottom T-shaped outflow piece now forms a support surface, these drawbacks have been efficiently eliminated. In addition, it is thus easier for liquid to pass through the tube, as the risk of the tube 40 being closed by the reservoir 30 is much reduced. In addition, due to the double outflow, the risk of a blockage or the like is also much reduced.

In the illustrated example, the spacer tube 40 has a substantially vertical orientation in the reservoir 30, at least in the non-filled state of the reservoir 30, as shown in FIGS. 2-4. The spacer tube 40 is flexible, so that, as the appearance of the reservoir 30 becomes more and more cylindrical during filling of the reservoir 30, and the height of the reservoir 30 decreases, in which case the attachment locations 41, 42 of the spacer tube 40 come to lie at a shorter distance from each other, the spacer tube 40 can open out and thus compensate for said change in distance. Furthermore, the spacer tube 40 in the illustrated example is perforated, so that it is able to allow liquid through. However, such a perforation is not necessary in order to allow liquid into and out of the reservoir. By using the spacer tube 40, it is ensured that there is always a liquid passage between the opening 35 and a bottom part of the reservoir 30, by preventing that, in the flat, non-filled state of the reservoir 30, two parts 37, 38 of the reservoir 30, which are flat in this state and extend at a small distance next to each other, come to lie completely against each other.

The spacer tube 40 may be attached to the reservoir 30 at one or more locations with respect to the material of one of the parts 37, 38 of the reservoir 30, for example to the part 37 of the reservoir 30 which is provided with the opening 35, so that forces can be exerted on the spacer tube 40 at one or more additional locations, in addition to the attachment locations 40, 41, when the reservoir 30 is undergoing a change in shape, and the opening out and bending back of the spacer tube 40 can take place in a controlled manner.

As is clear from the above, the purpose of the design of the reservoir 30 is to offer the possibility of varying the appearance of the reservoir 30 depending on its fill level, with the volume of the reservoir 30 being larger when the fill level of the reservoir 30 is higher. In addition, it is advantageous if the design of the reservoir 30 is aimed at providing the possibility of suspending the reservoir 30 in the tank 2 only by its top side. In particular, in the vehicle 1, the reservoir 30 may be suspended on a top wall part of the tank 2. In the illustrated example, the reservoir 30 comprises an elongate strip 50 having a U-shaped cross section, which extends on the top side of the reservoir 30 along a substantial part of the length of the reservoir 30, between the two convex ends 33, 34 of the reservoir 30. In particular, the strip 50 is provided on a top part of the bag 31, with said edge portion being incorporated therein. The strip 50 is therefore oriented in such a way that the U shape of the strip 50 is open towards the bottom. In order to be able to follow the deformation of said edge portion during filling or emptying of the reservoir 30, it is practical if the elongate strip 50 is deformable, in any case in such a way that its U shape can be opened wider or, on the contrary, less wide. In this context, it should be noted that a minimum opened state of the U shape relates to a non-filled state of the reservoir 30, as illustrated in FIGS. 2-4, and that a maximum opened state of the U shape relates to a completely filled state of the reservoir 30, as illustrated in FIG. 5. For the purpose of suspending the reservoir 30 in the tank 2, the reservoir 30 comprises a suspension bar 51 which extends at the location of the bottom part of the U shape of the elongate strip 50 through the strip 50, that is to say, through a hollow tubular space 52 which is situated between the top edge portion of the bag 31 and the bottom of the U shape of the strip 50. For the sake of completeness, it should be noted here that the designations of the bottom part of the U shape and the bottom of the U shape are understood to be designations which relate to the U shape as such, i.e. independent of its orientation, which, in the case of the illustrated strip 50, is upside down. Ends of the suspension bar 51 protrude just beyond the strip 50 on both sides and are provided with suspension eyelets 53 on which an arbitrary suitable means for coupling the reservoir 30 to a suspension location in the tank 2 can be attached. Incidentally, the use of the suspension bar 51 as illustrated in the figures and as described above is only one of the many possibilities which are conceivable within the scope of the invention with regard to the positioning and attachment of the reservoir 30 in the tank 2. Thus, the strip may also protrude beyond the bar 51, if suitable holes have been made in the strip 50, as a result of which the bar 51 can be suspended via its suspension eyelets 53.

It will be clear to those skilled in the art that the scope of the invention is not limited to the above-described examples, but that various variations and modifications thereof are possible without departing from the scope of the invention as defined in the attached claims.

In the embodiment of the vehicle 1 as illustrated in FIG. 1, a single reservoir 30 for spraying liquid is provided in the vehicle 1. However, this does not mean that the invention is limited to such an application of one reservoir 30 in the vehicle.

In the embodiment of the reservoir 30 as illustrated in FIGS. 2-5, a single spacer tube 40 is provided. However, this does not mean that it would not be possible to use more spacer tubes 40 and/or other suitable spacer means in the reservoir 30 without departing from the scope of the invention.

The invention claimed is:

1. A wheeled manure-removal vehicle for removing manure from an animal-shed floor, comprising:

a tank for storing manure;
a manure collector;
a liquid reservoir placed in the tank and having an opening for the supply of liquid to the reservoir and the discharge of liquid from the reservoir, and a flexible reservoir wall; and
a dispenser operatively connected to the reservoir for dispensing liquid from the reservoir onto the animal-shed floor,
wherein the opening of the reservoir is situated in a top part of the reservoir, and wherein the reservoir comprises a spacer extending on the inside of the reservoir from the opening down to the lower part of the reservoir to ensure a liquid passage between the opening and a bottom part of the reservoir.

2. The vehicle as claimed in claim 1, wherein the spacer comprises an elongate body extending on the inside of the reservoir, between an attachment location situated at the highest at the location of the opening of the reservoir and an attachment location situated at the lowest at a bottom of the reservoir.

3. The vehicle as claimed in claim 2, wherein the elongate body is flexible.

4. The vehicle as claimed in claim 2, wherein the elongate body comprises a bar.

5. The vehicle as claimed in claim 2, wherein the elongate body comprises a tube.

6. The vehicle as claimed in claim 5, wherein the tube is perforated.

7. The vehicle as claimed in claim 1, wherein the reservoir is suspended in the tank only by a top side thereof.

8. The vehicle as claimed in claim 7, wherein the reservoir is suspended on a top wall part of the tank.

9. The vehicle as claimed in claim 7, wherein the reservoir is situated in a top part of the tank.

10. The vehicle as claimed in claim 7, wherein the reservoir has a hollow tubular space on the top side, wherein a suspension is provided extending through the space, and wherein ends of the suspension extend outside the space and are attached to a wall part of the tank.

11. The vehicle as claimed in claim 10, wherein the top side of the reservoir is provided with an elongate strip having a U-shaped cross section, and furthermore comprises a bag of flexible material, wherein the elongate strip is arranged on an edge portion of the bag, with the edge portion being incorporated therein, and wherein the elongate strip is deformable, at least to allow variation with regard to the degree to which the U-shaped cross section is opened up.

12. The vehicle as claimed in claim 11, wherein the bag of the reservoir is cylindrical in the filled state, having an oval or round cross section and convex ends.

13. The vehicle as claimed in claim 1, wherein the dispenser comprises at least one spray nozzle, and a duct extending between the opening of the reservoir and the spray nozzle.

14. The vehicle as claimed in claim 1, wherein the vehicle is self-propelled.

15. The vehicle as claimed in claim 7, wherein the reservoir has a hollow tubular space on the top side, wherein a suspension is provided extending through the space, and wherein ends of the suspension extend outside the space and are detachably attached to a wall part of the tank.

16. The vehicle as claimed in claim 3, wherein the elongate body comprises a bar.

17. The vehicle as claimed in claim 3, wherein the elongate body comprises a tube.

18. The vehicle as claimed in claim 2, wherein the reservoir is suspended in the tank only by a top side thereof.

19. The vehicle as claimed in claim 3, wherein the reservoir is suspended in the tank only by a top side thereof.

* * * * *